United States Patent Office
2,906,751
Patented Sept. 29, 1959

2,906,751
7-KETO ALLOSTEROIDS

Carl Djerassi, Birmingham, Mich., and George Rosenkranz, Mexico City, Mexico, assignors to Syntex, S.A., Mexico City, Mexico, a corporation of Mexico No Drawing. Application August 13, 1954
Serial No. 449,765

11 Claims. (Cl. 260—239.55)

The present invention relates to certain novel cyclopentanophenanthrene compounds and to a process for the production of the same.

More particularly, the present invention relates to certain novel compounds especially valuable as key intermediates in the conversion of ring C unsubstituted steroidal compounds, such as steroidal sapogenins, to the corresponding C-11 oxygenated derivatives.

In accordance with the present invention it has been discovered that when $\Delta^{7,9(11)}$ allosteroids are oxidized with lower fatty peracids such as performic acid, or peracetic acid, preferably in situ, a corresponding oxido ketone is produced which is believed to have a structure corresponding to a first oxygen substituent in ring B and a second oxygen substituent in ring C, the ring C oxygen substituent being attached to the 9,11 carbons in alpha configuration, and the ring B oxygen substituent being attached to the 7 carbon. The novel oxide ketones produced in accordance with the present invention may be prepared for example by oxidizing $\Delta^{7,9(11)}$-22-isoallospirostadien-3$\beta$-ol which may be prepared in accordance with the process set forth in the application of Rosenkranz and Djerassi, Serial No. 191,942, filed October 24, 1950, now Patent No. 2,858,307, granted October 28, 1958 with performic acid preferably formed in situ. These novel oxido ketones may be exemplified by the following structural formula

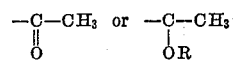

In the above structural formula R may be hydrogen or a lower fatty acid residue, as for example the residue of acetic or propionic acid, and Y in the above formula is selected from the group consisting of

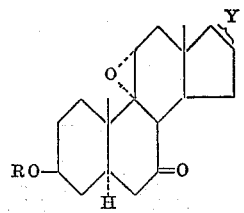

and

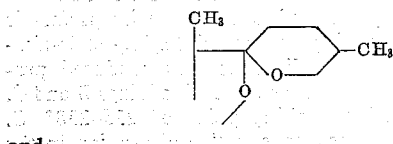

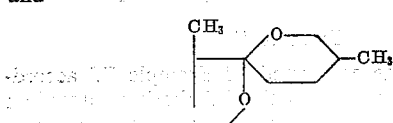

As may be understood, however, the present invention is not limited to reactions in the allosapogenin series and in place of Y, compounds having the above structure and the 17 side chains characterizing other steroids may be produced. As examples we may mention the allopregnane type of 17 sidechain, $$-\underset{\underset{O}{\|}}{C}-CH_3 \quad \text{or} \quad -\underset{\underset{OR}{|}}{C}-CH_3$$

or the 17 side chain characteristic of ergosterol.

The present novel process therefore is applicable generally to $\Delta^{7,9(11)}$ allosteroids with the consequent production of novel allosteroid oxido ketones having an oxygen substituent in ring B and a second oxygen substituent in ring C, the ring C oxygen substituent being attached to the 9,11 carbons in $\alpha$-configuration and the ring C oxygen substituent being attached to the 7 carbon.

It has further been found that treatment with alkali of the intermediate compounds above set forth leads to an $\alpha,\beta$ unsaturated ketone having the characteristic ultraviolet absorption maximum at 252 mu which possesses, in addition to a double bond at the 8,9 position, the 11$\alpha$-hydroxy-7-keto structure. These novel hydroxy ketones may be exemplified by the following formula:

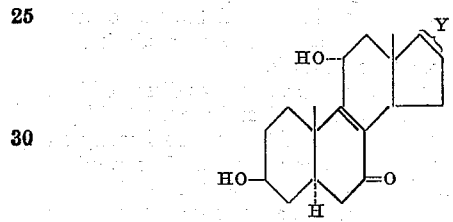

In the above formula Y represents the same radicals as hereinbefore set forth in the case of compounds characteristic of the sapogenin series, but similar compounds possessing side chains characteristic of other allosteroids are also within the scope of the present invention.

Further, acylation produced the corresponding esterified compounds which may be repesented by the following formula

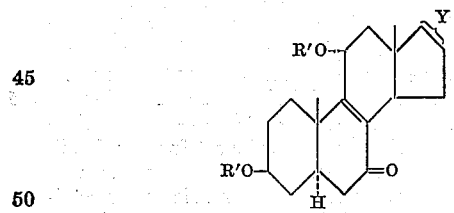

In the above formula $R^1$ represents the residue of a suitable acid utilized for acylation, as for example a lower fatty acid, such as acetic or propionic acid.

A sapogenin compound such as that disclosed above or the corresponding free diol may be catalytically hydrogenated using a palladium charcoal catalyst to prepare the corresponding saturated compound. The saturated compound may then be subjected to Wolff-Kishner reduction to remove the 7-keto group as disclosed in United States application Serial No. 291,555 now Patent No. 2,712,027, granted June 28, 1955. The resultant compound is 22-isoallospirostan-3$\beta$,11$\alpha$-diol which may be converted to cortisone by the process disclosed in United States application Serial No. 307,722 now Patent No. 2,733,079, granted December 4, 1956.

The process according to the present invention may, therefore, be exemplified by the following equation

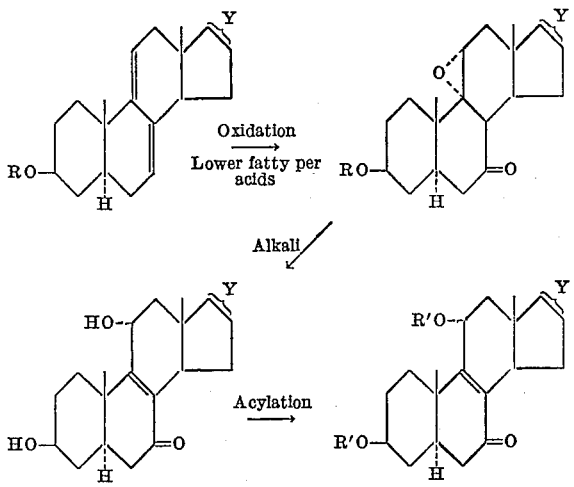

In proceeding in accordance with the process of the present invention a suitable $\Delta^{7,9(11)}$ allosteroid such as $\Delta^{7,9(11)}$-22-isoallospirostadien-3$\beta$-ol 3-acetate was dissolved in a suitable solvent, such as chloroform, together with formic acid or acetic acid and then treated at a temperature above room temperature, as for example 35° C. with successive portions of hydrogen peroxide. The reaction mixture is then allowed to stand at room temperature for a substantial period of time, as for example two hours, ether is then added and the solution washed, dried and concentrated until the beginning of crystallization. The reaction mixture was then chilled and filtered to yield crystals of the desired product, namely an oxido ketone having the structure above set forth.

Thereafter the oxido ketone product was dissolved in a suitable solvent, such as methanol and refluxed with an alkali, such as potassium hydroxide for aproximately an hour until a clear solution was obtained. The product solution was then diluted with water and upon filtration colorless crystals of an unsaturated ketone, as previously described, exhibiting an absorption maximum at 252 mu, was prepared. The above unsaturated hydroxy ketone could then be acylated in the usual way, as for example by heating with acetic anhydride and pyridine to acylate the hydroxy group which was in the 11$\alpha$ position as hereinbefore set forth.

As previously set forth the above reactions are believed to be generally applicable to corresponding $\Delta^{7,9(11)}$ steroids and although the above equations illustrate the reactions and products obtained, for example by a process involving $\Delta^{7,9(11)}$-22-isoallospirostadien-3$\beta$-ol, the same reactions are applicable to other allosteroids, as for example, $\Delta^{7,9(11)}$-allopregnadien-3$\beta$-20-diol diacetate or $\Delta^{7,9(11)}$-allopregnadiene-3$\beta$-ol-20-one, or $\Delta^{7,9(11),22(23)}$ - ergostatrien-3$\beta$-ol propionate, as will hereinafter be set forth in detail.

The resultant products such as $\Delta^8$ - allopregnene-3$\beta$,11$\alpha$,20-triol-7-one are valuable intermediates for cortisone synthesis since catalytic hydrogenation of the double bond and Wolff-Kishner reduction will remove the 7-keto group and the resultant saturated triol can be readily oxidized to allopregnane-3,11,20-trione. This compound can be selectively reduced with Raney nickel catalyst to give the known cortisone intermediate allopregnane-3$\beta$-ol-11,20-dione.

The following specific examples serve to illustrate the invention but are not intended to limit the same:

Example I

A solution of 2.5 g. of $\Delta^{7,9(11)}$-22-isoallospirostadien-3$\beta$-ol 3-acetate, prepared in accordance with the procedure of United States application Serial No. 191,942, in 20 cc. of chloroform and 400 cc. of 90% formic acid was treated at 35° in portions with 2.5 cc. of a 30% aqueous solution of hydrogen peroxide. After standing at room temperature for two hours, ether was added and the solution washed well with water, carbonate, water, dried and concentrated until crystallization commenced. Chilling and filtration, followed by washing with cold ether yielded colorless crystals with a melting point of 245–260° C. Further recrystallization from chloroform - methanol raised the melting point to 295–297° C. $(\alpha)_D^{20}$—128°, no selective absorption in the ultraviolet. The product was 9$\alpha$,11$\alpha$-oxido-22-isoallospirostan-3$\beta$-ol-7-one acetate.

Analysis.—Calculated for $C_{29}H_{42}O_6$: C, 71.57; H, 8.70. Found: C, 71.74; H, 8.94.

A similar reaction with $\Delta^{7,9(11),22(23)}$-ergostatrien-3$\beta$-ol-7-one propionate using a temperature of 70° C. and 18 cc. of formic acid in 13 cc. of ethylene dichloride with the addition of 10 cc. of hydrogen peroxide gave $\Delta^{22(23)}$-9$\alpha$,11$\alpha$ - oxido - ergosten-3$\beta$-ol-7-one propionate, melting point 188–191° C.

A similar reaction to the above utilizing peracetic acid formed similarly in situ gave the same products.

Example II

A suspension of 0.2 g. of the above product, 9$\alpha$,11$\alpha$-oxido-22-isoallospirostan-3$\beta$-ol-7-one acetate, in 30 cc. of methanol was refluxed with 0.2 g. of potassium hydroxide for one hour at which time a clear solution was obtained. Dilution with water and filtration afforded in nearly quantitative yield colorless crystals with a melting point of 185–192° C., which exhibited an ultraviolet absorption maximum at 252 mu (log E 4.03) which is to be expected from the unsaturated ketone $\Delta^{8(9)}$-22-isoallospirosten-3$\beta$,11$\alpha$-diol-7-one produced. After recrystallization from acetone-hexane, the compound showed a melting point of 211.5–213.5° C. $(\alpha)_D^{20}$—27°, ultraviolet maximum 254 mu (log E 4.02).

Analysis.—Calculated for $C_{27}H_{40}O_5$: C, 72.94; H, 9.07. Found: C, 73.08; H, 9.17.

A similar reaction with the erogsterol compound of Example I gave $\Delta^{8(9),22(23)}$-ergostadien-3$\beta$-11$\alpha$-diol-7-one having a melting point of 111–114° C.

Example III

A solution of 0.4 g. of the product from Example II, in 5 cc. of acetic anhydride and 5 cc. of pyridine was heated at 100° for one hour, poured into water, extracted with ether, the ether washed until neutral, dried and evaporated. Recrystallization from hexane containing a few drops of acetone gave colorless crystals with a melting point of 168–171° C. $(\alpha)_D^{20}$+7°, ultraviolet absorption maximum at 252 mu (log E 4.21) and infrared bands at 1676 cm.$^{-1}$ (unsaturated carbonyl band) and 1736 cm.$^{-1}$ (acetate band). The compound was the 3,11 diacetate of $\Delta^{8(9)}$-22-isoallospirosten-3$\beta$,11$\alpha$-diol-7-one.

Analysis.—Calculated for $C_{31}H_{44}O_7$: C, 70.43; H, 8.39. Found: C, 70.55; H, 8.51.

Example IV $\Delta^{7,9(11)}$-allopregnadien-3$\beta$-20-diol diacetate prepared by reducing $\Delta^7$-allopregnen-3$\beta$-ol-20-one 3-acetate of United States application Serial No. 191,943 with lithium aluminum hydride to form $\Delta^7$-allopregnen-3$\beta$,20-diol followed by treatment with acetic anhydride and pyridine to form $\Delta^7$-allopregnen-3$\beta$-20-diol diacetate which was thereafter dehydrogenated with mercuric acetate was treated in accordance with the process of Example I with performic acid. The corresponding compound 9$\alpha$,11$\alpha$-oxido-allopregnene-3$\beta$,20-diol-7-one diacetate was produced provided with an oxygen substituent in each of rings B and C. The compound had a melting point of 235–238° C. $(\alpha)_D^{20}$—55°. There was no selective absorption in the ultraviolet.

Example V

Treatment of the compound of Example IV according to the procedure of Example II similarly produced an $\alpha$,$\beta$ unsaturated hydroxy ketone. $\Delta^{8(9)}$ - allopregnene- 3β,11α,20-triol-7-one having a melting point of 250–252° C. and $(\alpha)_D^{20}$ —28° (in alcohol). The ultraviolet absorption maximum was at 254 mu (log E 4.12).

*Example VI*

The compound of Example V was treated with acetic anhydride and pyridine according to the procedure of Example III and a corresponding 3,11,20 triacetate compound produced having a melting point of 203–205° C.

The present application is a continuation-in-part of our United States application Serial No. 226,534, filed May 15, 1951, now abandoned.

We claim:

1. A novel steroid oxidoketone of the sapogenin series characterized by the following formula

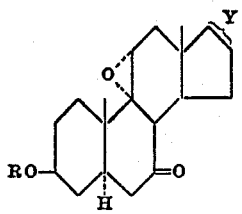

wherein R is selected from the group consisting of hydrogen and a lower fatty acid residue, and Y is selected from the group of radicals of the following formula

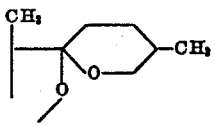

and

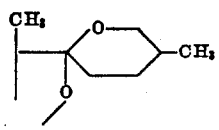

2. A novel steroid hydroxy ketone of the sapogenin series characterized by the following formula

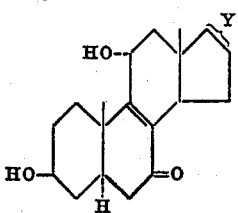

wherein Y is selected from the group consisting of radicals having the following formula

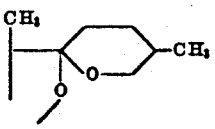

and

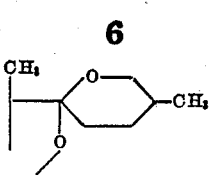

3. A novel compound of the sapogenin series characterized by the following formula

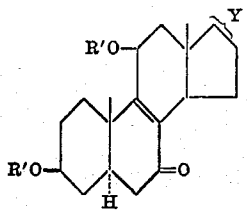

wherein $R^1$ is selected from the group consisting of hydrogen and a lower fatty acid residue, and Y is selected from the group consisting of radicals having the following formula

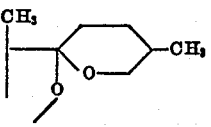

and

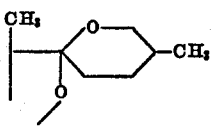

4. 9α,11α-oxido-22-isoallospirostan-3β-ol-7-one acetate.
5. $\Delta^{8(9)}$-22-isoallospirosten-3β,11α-diol-7-one.
6. $\Delta^{8(9)}$-22-isoallospirosten-3β,11α-diol-7-one diacetate.
7. 9α,11α-oxido-allopregnane - 3β,20-diol-7-one diacetate.
8. $\Delta^{8(9)}$-allopregnene-3β,11α,20-triol-7-one.
9. The triacetate of $\Delta^{8(9)}$-allopregnene-3β,11α,20-triol-7-one.
10. A process for the production of a novel allosteroid having an α oxido group attached to carbon atoms 9 and 11 and a keto group at position 7 of the steroid nucleons which comprises oxidizing a corresponding $\Delta^{7,9(11)}$ allosteroid with an in situ formed lower fatty peracid.
11. The process of claim 10 wherein the lower fatty peracid is in situ formed performic acid.

References Cited in the file of this patent

UNITED STATES PATENTS 2,712,027    Rosenkranz et al. -------- June 28, 1955

OTHER REFERENCES

Stock: J. Am. Chem. Soc., vol. 73, pages 3546–37, July 1951.